United States Patent
Balamane et al.

(10) Patent No.: US 9,099,112 B1
(45) Date of Patent: Aug. 4, 2015

(54) NEAR FIELD TRANSDUCER HAVING NOTCH DIFFUSION BARRIER

(71) Applicant: HGST Netherlands B.V., Amsterdam (NL)

(72) Inventors: Hamid Balamane, Portola Valley, CA (US); Joseph A. Bonetti, San Jose, CA (US); Jordan A. Katine, Mountain View, CA (US); Vijay P. S. Rawat, San Jose, CA (US); Neil L. Robertson, Palo Alto, CA (US); Erhard Schreck, San Jose, CA (US); Matteo Staffaroni, Pleasanton, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/170,462

(22) Filed: Jan. 31, 2014

(51) Int. Cl.
*G11B 5/127* (2006.01)
*G11B 5/31* (2006.01)
*G11B 5/40* (2006.01)
*G11B 5/00* (2006.01)
*G11B 13/08* (2006.01)

(52) U.S. Cl.
CPC .............. *G11B 5/314* (2013.01); *G11B 5/3163* (2013.01); *G11B 5/40* (2013.01); *G11B 13/08* (2013.01); *G11B 2005/0021* (2013.01)

(58) Field of Classification Search
CPC ........... G11B 2005/0021; G11B 5/314; G11B 5/6088; G11B 13/08; G11B 5/3163; G11B 5/40
USPC ......... 360/59, 125.3, 128, 125.31; 369/13.33, 369/13.32, 13.13
See application file for complete search history.

(56) References Cited

U.S. PATENT DOCUMENTS

| | | | |
|---|---|---|---|
| 6,999,384 B2 | 2/2006 | Stancil et al. | |
| 7,880,996 B2 | 2/2011 | Stipe | |
| 8,169,881 B2 | 5/2012 | Balamane et al. | |
| 8,320,219 B1 | 11/2012 | Wolf et al. | |
| 8,339,740 B2 * | 12/2012 | Zou et al. | 360/125.31 |
| 8,351,151 B2 | 1/2013 | Katine et al. | |
| 8,351,305 B2 | 1/2013 | Zhou et al. | |
| 8,427,925 B2 | 4/2013 | Zhao et al. | |
| 8,451,705 B2 | 5/2013 | Peng et al. | |

(Continued)

OTHER PUBLICATIONS

Bain, J. et al., "Near Field Optical Transducers (NFTs) for Heat Assisted Magnetic Recording (HAMR)," Team Research Paper, Sponsored by Data Storage Systems Center (DSSC) and Sponsoring Companies, pp. 1-2, 2014.

(Continued)

*Primary Examiner* — Will J Klimowicz
(74) *Attorney, Agent, or Firm* — Zilka-Kotab, PC

(57) ABSTRACT

An apparatus according to one embodiment includes a near field transducer comprising a conductive metal film having a main body, a notch extending from the main body, and a notch diffusion barrier layer interposed between the notch and the main body. An apparatus according to another embodiment includes a write pole, and a near field transducer adjacent the write pole. The near field transducer includes a conductive metal film having a main body, a notch extending from the main body, and a notch diffusion barrier layer interposed between the notch and the main body. The notch diffusion barrier layer includes a metal selected from a group consisting of Rh, W, Mo, Ru, Ir, Co, Ni, Pt, B, and alloys thereof. Additional systems and methods are also presented.

20 Claims, 9 Drawing Sheets

(56) References Cited

U.S. PATENT DOCUMENTS

| | | | |
|---|---|---|---|
| 8,472,286 | B2 | 6/2013 | Stipe |
| 8,477,454 | B2 | 7/2013 | Zou et al. |
| 8,514,673 | B1 * | 8/2013 | Zhao et al. ............... 369/13.33 |
| 8,553,505 | B2 | 10/2013 | Rawat et al. |
| 8,670,215 | B2 * | 3/2014 | Zou et al. ............... 360/125.31 |
| 8,804,468 | B2 * | 8/2014 | Zhao et al. ............... 369/13.33 |
| 8,902,719 | B2 * | 12/2014 | Zhao et al. ............... 369/13.33 |
| 2012/0039155 | A1 | 2/2012 | Peng et al. |
| 2012/0045662 | A1 * | 2/2012 | Zou et al. ............... 428/810 |
| 2012/0105996 | A1 * | 5/2012 | Katine et al. ............... 360/59 |
| 2012/0163139 | A1 | 6/2012 | Vavra et al. |
| 2013/0286804 | A1 * | 10/2013 | Zhao et al. ............... 369/13.33 |
| 2014/0050058 | A1 * | 2/2014 | Zou et al. ............... 369/13.33 |
| 2014/0313872 | A1 * | 10/2014 | Rawat et al. ............... 369/13.33 |
| 2014/0376341 | A1 * | 12/2014 | Wessel et al. ............... 369/13.33 |
| 2014/0376342 | A1 * | 12/2014 | Wessel et al. ............... 369/13.33 |
| 2014/0376345 | A1 * | 12/2014 | Seets et al. ............... 369/13.33 |

OTHER PUBLICATIONS

Kryder, M. et al., "Heat Assisted Magnetic Recording," Proceedings of the IEEE, vol. 96, No. 11, Nov. 2008, pp. 1810-1835.

Itagi, A.V. et al., "Ridge Waveguide as a Near-Field Optical Source," Applied Physics Letters, vol. 83, No. 22, Dec. 1, 2003, pp. 4474-4476.

Kong, Y. et al., "Evanescent Coupling Between Dielectric and Plasmonic Waveguides for HAMR Applications," IEEE Transactions on Magnetics, vol. 47, No. 10, Oct. 2011, pp. 2364-2367.

Powell, S. et al., "The Influence of Media Optical Properties on the Efficiency of Optical Power Delivery for Heat Assisted Magnetic Recording," Journal of Applied Physics, vol. 109, 2011, pp. 07B775-1-07B775-3.

Ikkawi, R., et al., "Near-Field Optical Transducer for Heat-Assisted Magnetic Recording for Beyond-10-Tbit/in2 Densities," American Scientific Publishers, Journal of Nanoelectronics and Optoelectronics, 2008, vol. 3, pp. 44-54.

* cited by examiner

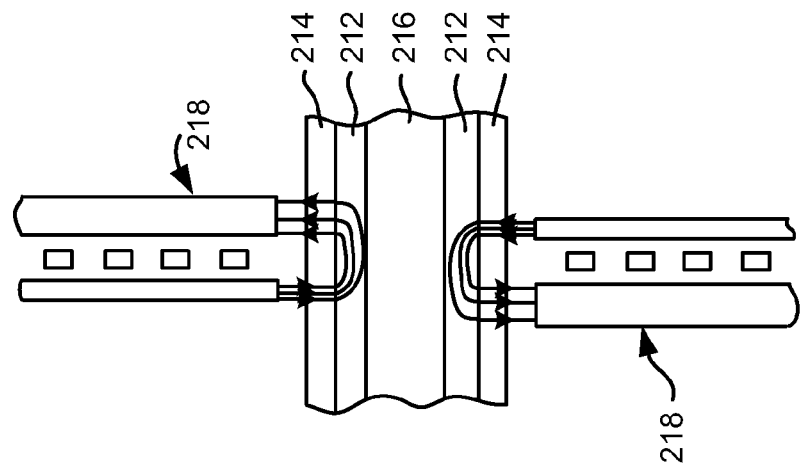
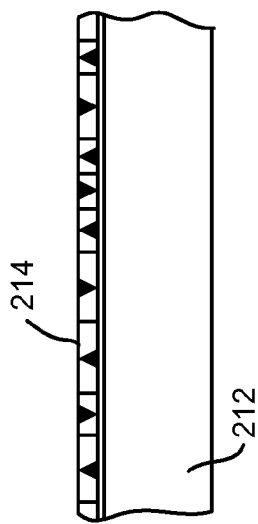
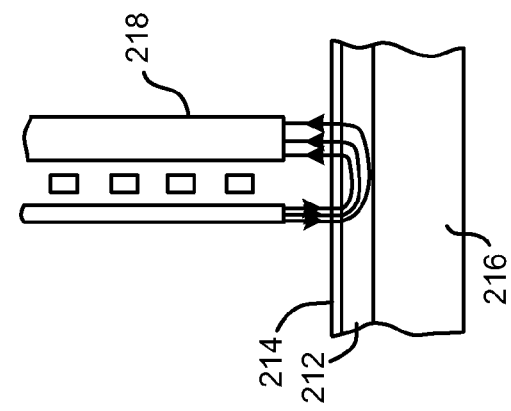
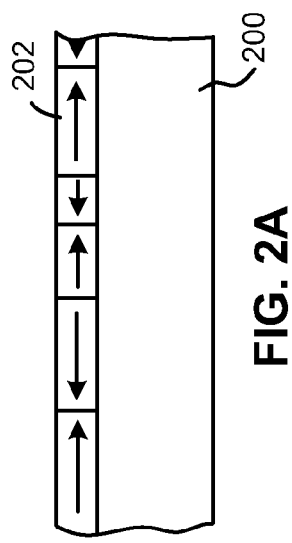
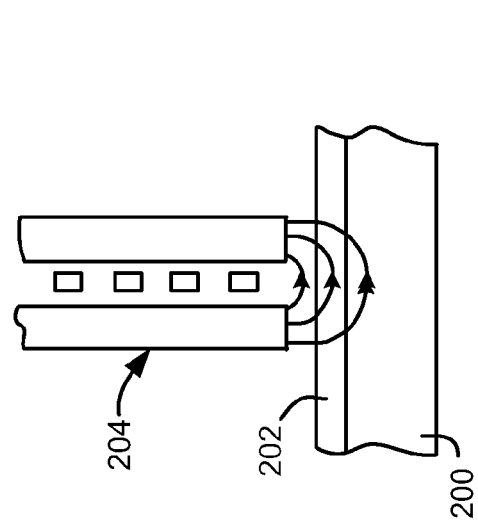

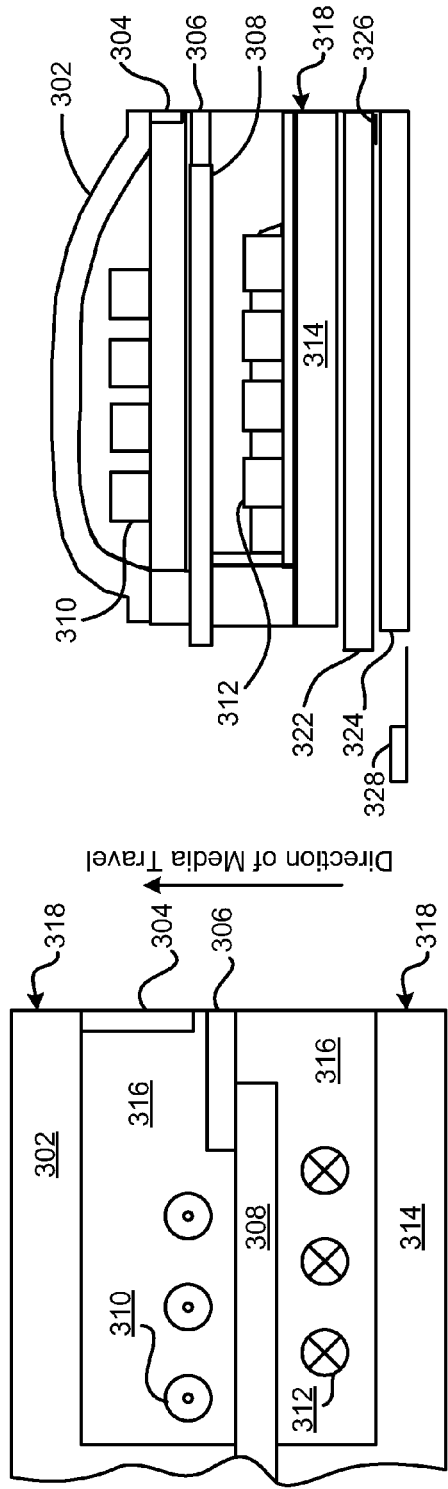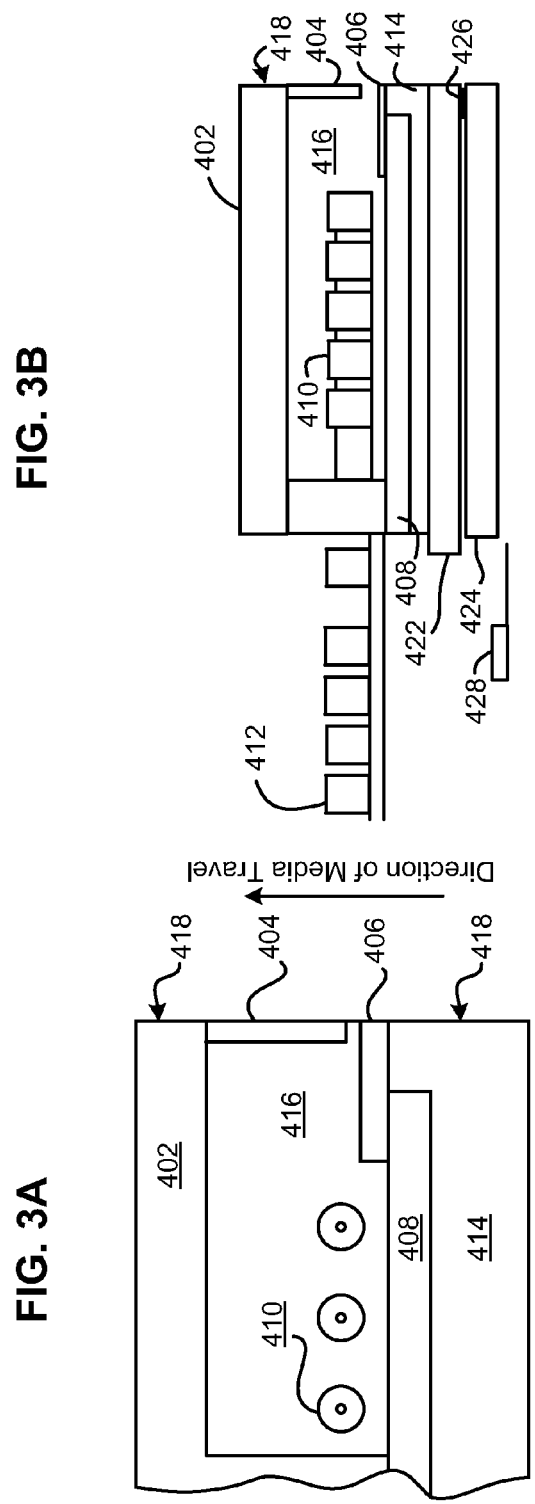

NEAR FIELD TRANSDUCER HAVING NOTCH DIFFUSION BARRIER

FIELD OF THE INVENTION

The present invention relates to data storage systems, and more particularly, this invention relates to near field transducers having a diffusion barrier and methods for making the same.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating (in some disk drives, there is a load/unload ramp so contact with the disk does not occur); but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials which will make data recording more challenging.

One additional solution has been proposed, which employs heat to lower the effective coercivity of a localized region on the magnetic media surface and writes data within this heated region. The data state becomes "fixed" upon cooling the media to ambient temperatures. This technique is broadly referred to interchangeably as "heat assisted magnetic recording" (HAMR) or "thermally assisted (magnetic) recording", TAR or TAMR. HAMR can be applied to both longitudinal and perpendicular recording systems, although the highest density state of the art storage systems are more likely to be perpendicular recording systems. Heating of the media surface has been accomplished by a number of techniques such as focused laser beams or near field optical sources.

U.S. Pat. No. 6,999,384 to Stancil et al., which is herein incorporated by reference, discloses near field heating of a magnetic medium.

However, materials used to form components of current HAMR write heads are unable to withstand the high temperatures encountered by the recording head during write operations. What is needed is a way to further improve thermal stability of HAMR write heads.

SUMMARY OF THE INVENTION

An apparatus according to one embodiment includes a near field transducer comprising a conductive metal film having a main body, a notch extending from the main body, and a notch diffusion barrier layer interposed between the notch and the main body.

An apparatus according to another embodiment includes a write pole, and a near field transducer adjacent the write pole. The near field transducer includes a conductive metal film having a main body, a notch extending from the main body, and a notch diffusion barrier layer interposed between the notch and the main body. The notch diffusion barrier layer includes a metal selected from a group consisting of Rh, W, Mo, Ru, Ir, Co, Ni, Pt, B, and alloys thereof.

A method according to one embodiment includes forming a magnetic pole, forming a body of a near field transducer structure above the magnetic pole, forming a notch diffusion barrier layer above the body, forming a notch layer above the notch diffusion barrier layer, and defining a notch from the notch layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for perpendicular recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus includes a near field transducer comprising a conductive metal film having a main body, a notch extending from the main body, and a notch diffusion barrier layer interposed between the notch and the main body.

In another general embodiment, an apparatus includes a write pole, and a near field transducer adjacent the write pole. The near field transducer includes a conductive metal film having a main body, a notch extending from the main body, and a notch diffusion barrier layer interposed between the notch and the main body. The notch diffusion barrier layer includes a metal selected from a group consisting of Rh, W, Mo, Ru, Ir, Co, Ni, Pt, B, and alloys thereof.

In yet another general embodiment, a method includes forming a magnetic pole, forming a body of a near field transducer structure above the magnetic pole, forming a notch diffusion barrier layer above the body, forming a notch layer above the notch diffusion barrier layer, and defining a notch from the notch layer.

Figure 1:
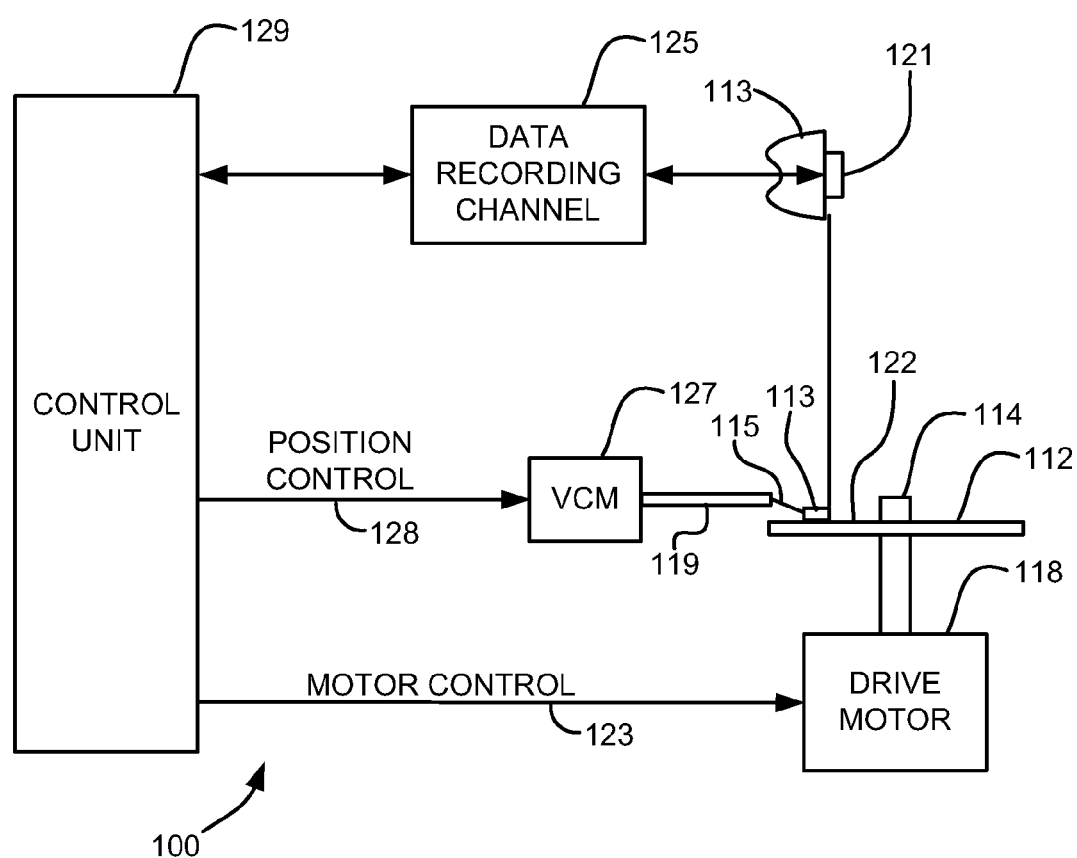
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

In some embodiments, the disk drive 100 of FIG. 1 may be implemented for HAMR. Accordingly, the disk drive 100 may include an apparatus, e.g., see 500 and/or 600 of FIGS. 5 and 6A-6H, respectively. Thus, the read/write heads 121 of the disk drive 100 may operate in combination with an NFT as described in detail below.

With continued reference to the disk drive 100 of FIG. 1, an interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic domains in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording head 204, which may preferably be a thin film head, and a longitudinal recording medium, such as that of FIG. 2A.

FIG. 2C illustrates, schematically, a perpendicular recording head where, the orientation of magnetic domains substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic domains having their axes of magnetization substantially perpendicular to the surface of the medium. The flux is channeled by the soft underlying coating 212 back to the return pole of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

FIG. 4B illustrates another type of piggyback magnetic head having similar features to the head of FIG. 4A including looped coils 410, which loops around to form looped coils 412. Also, sensor shields 422, 424 are shown, with the upper sensor shield 422 spaced rom the writer by a nonmagnetic layer 414. The sensor 426 is typically positioned between the sensor shields 422, 424.

In FIGS. 3B and 4B, an optional heater 328, 428, respectively, is shown away from the media facing side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

HAMR, or equivalently TAR, is a method of recording information onto a magnetic recording medium, such as a disk, tape, etc. One general motivation for this invention relates to the design of a recessed dielectric waveguide and integration with a near-field optical transducer for HAMR. The waveguide core may be optimally recessed by a distance from the transducer and this space may be filled with low index dielectric material leading to significant enhancement of the optical efficiency. In one preferred embodiment, the low index dielectric material in the recessed space may be deposited after fabrication of the near-field transducer using an anisotropic deposition followed by deposition of the high index core material.

According to some embodiments, for HAMR to be realized, it may be beneficial to confine heat to about a single data track (an exemplary data track may be approximately 40 nm wide or smaller) with high efficiency. Candidate near-field optical sources typically use a low-loss metal (Au, Ag, Al, Cu, etc.) shaped in such a way as to concentrate surface charge motion at a tip apex located at the slider media facing side when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the notch slot waveguide from microwave circuits applied to optical frequencies (also known as the C aperture). Light polarization may be aligned with the notch and incident light may concentrate surface charge at the tip of the notch.

Previously, a notch waveguide in silver has been optimized at a wavelength of 516 nm and a metal-to-metal fly-height of 8 nm. Also, far field measurements obtained for various C aperture sizes indicate a spectral shift while narrow resonant behavior has been observed when a pattern of notches is used to excite surface plasmons around a long slot and enhance far field transmission. The majority of embodiments described herein relate to using a notch waveguide of some kind to enhance the writing capabilities in HAMR.

U.S. Pat. No. 6,999,384 to Stancil et al., incorporated by reference above, describes the phenomenon of near field heating of a magnetic medium in more detail.

As mentioned above, NFTs used in conventional HAMR heads have poor reliability and survival time due to excessive heating of the NFT components during write operations. Particularly, this heating causes the notch portion of the NFT to deform and/or diffuse away as a result of the notch portion's material characteristics, e.g., low melting temperatures. As a result, the effectiveness of the NFT is diminished, and often rendered useless, after a short period of time.

In sharp contrast, various embodiments herein include a diffusion barrier between the notch and base of the NFT, which desirably alleviates most of the material and thermal instabilities seen in conventional structures. Additionally, the diffusion barrier has a minimal impact on the optical properties of the NFT, thereby serving as a desirable solution to this conventional, and heretofore unresolved, problem.

Figure 5:
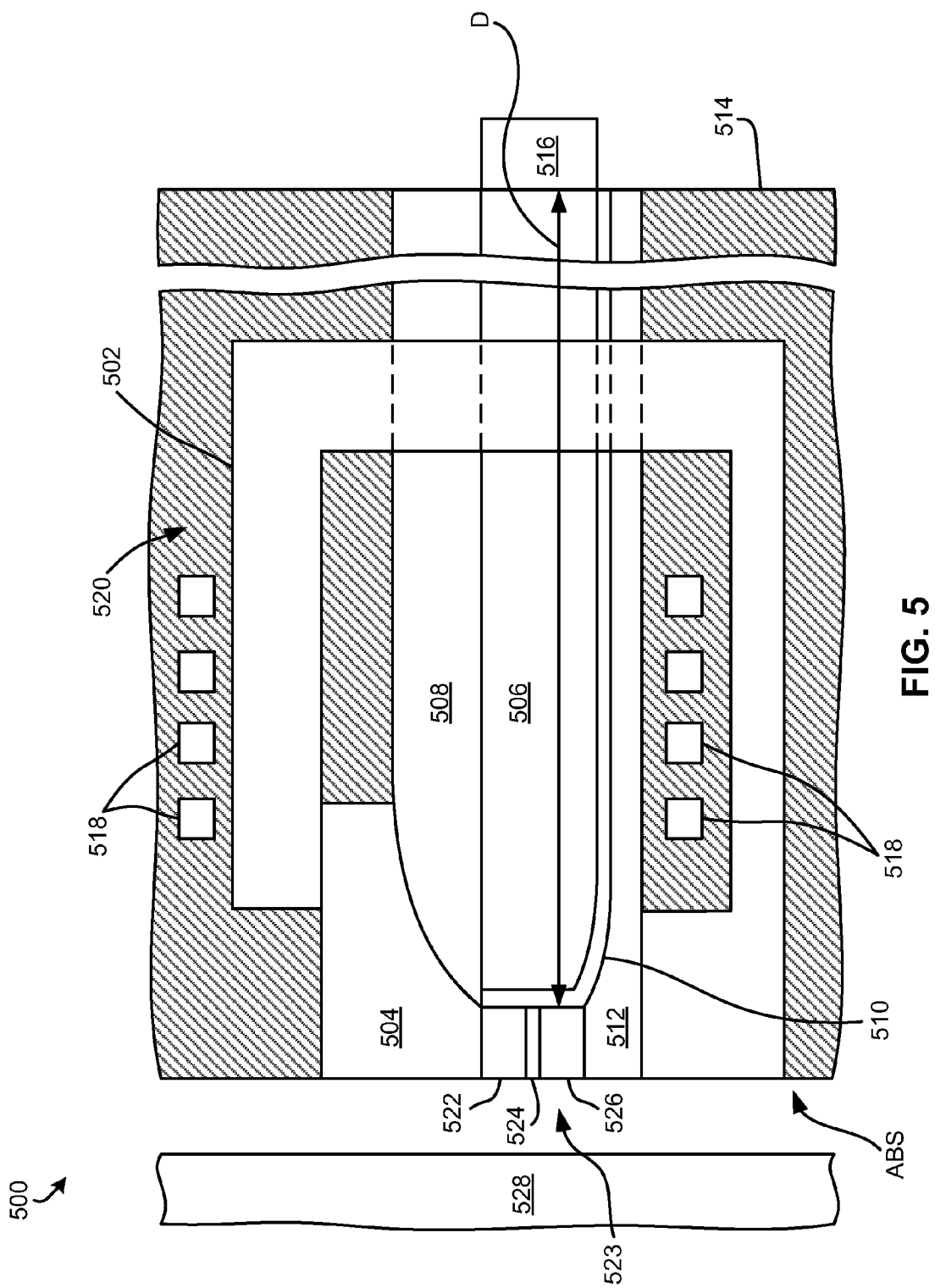
FIG. 5 is a partial cross sectional view of a thin film perpendicular write head according to one embodiment.

FIG. 5 depicts a partial cross sectional view of a magnetic HAMR head 500, in accordance with one embodiment. As an option, the present head 500 may be implemented in conjunction with features from any other embodiment listed herein, such as those described with reference to the other FIGS. Of course, however, such head 500 and others presented herein may be used in various applications and/or in permutations which may or may not be specifically described in the illustrative embodiments listed herein. Further, the head 500 presented herein may be used in any desired environment.

It should be noted that the dimensions of the components illustrated in FIG. 5 may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIG. 5 illustrates an illustrative cross sectional view of a magnetic HAMR head 500, additional and/or alternative layers and combinations of layers may be used in the structure as would be appreciated by one of ordinary skill in the relevant art upon reading the present disclosure, including insulating layers, adhesion layers, etc. In addition, any of the layers described in relation to head 500 may be comprised of multiple layers, which may or may not be of the same material.

Referring now to FIG. 5, the head 500 includes a return pole 502 which is coupled to the main pole 504, a portion of the main pole 504 being positioned at the media facing side. The return pole 502 may include a conventional magnetic alloy or material. Exemplary materials for the return pole 502 include Co, Ni, Fe, Cr etc. and/or combinations thereof. Moreover, the main pole 504 may include any known suitable material, such as NiFe, CoFe, CoNiFe, CoFeCr etc.

The head 500 also includes an optical waveguide 506, surrounded by cladding layers 508, 510, 512. According to the present embodiment, the cladding layers 508, 510, 512 are illustrated as extending to at least the flex side 514; although in other embodiments, some or all of the cladding layers may not extend to the flex side 514.

Moreover, one of the cladding layers 510 forms a recess between the waveguide 506 and the NFT 523. Further, cladding layer 510 is also directly adjacent a side of the waveguide 506, e.g., extending parallel to a longitudinal axis of the waveguide 506 along its stripe height. Additionally, another one of the cladding layers 512 extends below the NFT 523, thereby forming a portion of the media facing side. Thus, in some embodiments, the waveguide 506 may be positioned above two cladding layers 510, 512, e.g., as illustrated in FIG. 5.

In various embodiments, the cladding layers 508, 510, 512 may include any material as would be known to one of ordinary skill in the relevant art, such as $Al_2O_3$, $SiO_2$, etc. Moreover, the cladding layers 508, 510, 512 may include same, similar or different materials, depending on the desired embodiment.

The waveguide 506 extends to the flex side 514 having a near field optical source 516, e.g., a laser. However, in other approaches, the optical waveguide 506 may be spaced from the NFT by between about 80 nm and about 10 nm, by between about 60 nm and about 10 nm, by between about 100 nm and about 20 nm, by between about 100 nm and about 40 nm, etc., depending on the desired embodiment. It should be noted that, as used herein, the term "about" with reference to some stated value refers to the stated value ±10% of said value.

The optical source 516 emits an optical signal, e.g., light, that is desirably directed along the optical waveguide 506, towards the NFT. Thus the waveguide 506 is generally used to deliver light energy to the NFT which creates a small hot-spot on the surface of the media disk 528, thereby inducing isolated heating of the disk 528 surface. The waveguide 506 preferably includes a material having a high refractive index (e.g., at least higher than the cladding layers 508, 510, 512), thereby assisting in keeping the optical signal, emitted from the optical source 516, within the waveguide 506. Illustrative materials for the waveguide 506 include, but are not limited to, $TaO_x$, $TiO_x$, $NbO_x$, $ZrO_x$, HfOx etc. Other exemplary materials for the waveguide 506 may include $Ta_2O_5$, and/or $TiO_2$.

The cladding layers 508, 510, 512 preferably include a material having a low refractive index, e.g., so as to keep the optical signal confined within the sidewalls of the waveguide. In general, a low refractive index material may include any material having refractive index below about 1.75, but could be higher or lower depending on the desired embodiment. In other approaches, the low refractive index may be lower than the refractive index of the waveguide 506. Illustrative materials for the cladding layers 508, 510, 512 include refractive oxides such as $AlO_x$, $SiO_x$, etc. or other conventional materials having a desirably low refractive index.

As shown, the waveguide 506 may have an approximately uniform cross section along its length. The thickness of the waveguide 506 may be nominally between about 200 nm and about 400 nm, but is preferably thicker than the aperture 524.

However, as well known in the art, the waveguide 506 may have a number of other possible designs including a planar solid immersion mirror or planar solid immersion lens which have a non-uniform core cross section along the waveguide's length. Thus, according to various approaches, the waveguide 506 may have any other cross sectional profile as selected by one of ordinary skill in the relevant art, such as a rectangular, square, triangular, circular, etc., cross section.

With continued reference to FIG. 5, the head 500 also includes write coils 518 positioned in a conventional insulation layer 520, e.g., alumina. As would be appreciated by one skilled in the art, the write coils may assist the head 500 perform write operations by inducing a magnetic field in the return pole 502 which is transferred to the main pole 504 and concentrated in a magnetic lip 522 which is used to write to a magnetic medium 528 (e.g., a magnetic disk) spaced therefrom. In other words, the magnetic lip 522 may serve as a write pole. Thus, the magnetic lip 522 is preferably magnetically coupled to the main pole 504, and the return pole 502. In other embodiments, the main pole 504 may have a step formed near the lower portion of the main pole 504.

As illustrated, the NFT includes an aperture 524 (also known as a C aperture) and a main body 526 of a conductive metal film. However, the partial cross sectional view of the head 500 in FIG. 5 is not meant to limit the structure of the NFT as described herein. The process of forming an exemplary NFT structure will be described in further detail below, with reference to FIGS. 6A-6H.

The NFT 523 is used to assist in performing write operations. As described above, an NFT may be used to heat the magnetic medium, thereby softening the magnetic stability of the magnetic grains thereof. The energy to heat the magnetic medium may be supplied to the NFT 523 from the optical source 516 via the waveguide 506. In preferred embodiments, this allows for the magnetic field concentrated at the magnetic lip 522 to influence the magnetic orientation of the magnetic grains on the medium 528, e.g., to perform a write operation. Therefore, it is desirable that the NFT is located adjacent the magnetic lip 522, e.g., as illustrated in FIG. 5.

According to one embodiment, the magnetic lip 522 may have a nominal length (as measured from the media facing side in the stripe height direction) approximately equal to that of the main body 526, but the lengths may be different, e.g., as determined by the performance and/or properties of the near field optical source, NFT and/or magnetic lip. Moreover, according to various other embodiments, the length of the magnetic lip 522 may vary from about 50 nm to about 500 nm, more preferably between about 50 nm and about 200 nm, but may be higher or lower depending on the desired embodiment.

As alluded to above, FIGS. 6A-6H depict the process steps of a method for forming an apparatus 600 having an NFT, in accordance with one embodiment. As an option, the present apparatus 600 may be implemented in conjunction with features from any other embodiment listed herein, such as those described with reference to the other FIGS, particularly FIG. 5. Accordingly, various components of FIGS. 6A-6H have common numbering with those of FIG. 5.

Of course, however, such apparatus 600 and others presented herein may be used in various applications and/or in permutations which may or may not be specifically described in the illustrative embodiments listed herein. Further, the apparatus 600 presented herein may be used in any desired environment. Thus FIGS. 6A-6H (and the other FIGS.) should be deemed to include any and all possible permutations.

Figure 6A:
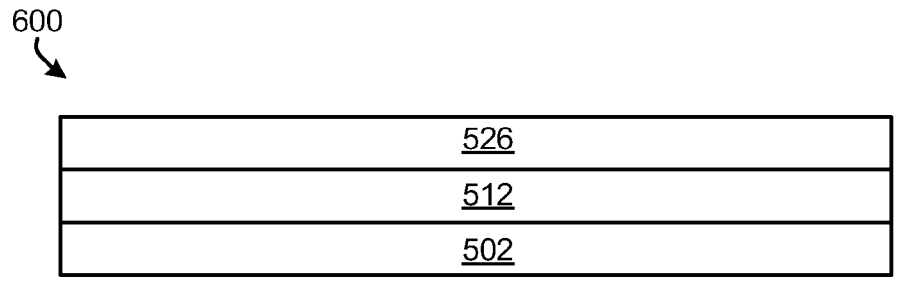
FIGS. 6A-6H are partial side views of process steps for forming a HAMR write head according to one embodiment.

Looking to FIG. 6A, a magnetic return pole 502, a lower cladding layer 512, and a main body 526 of a conductive metal film are deposited, e.g., using ion beam deposition, sputtering, electro plating, etc. or any other conventional process. An additional Chemical Mechanical Planarization (CMP) is preferably performed on the upper surface of the main body 526 of the conductive metal film, e.g., to smoothen the as-deposited surface of the main body 526.

The main body 526 of the conductive metal film forms a portion of a conductive metal film of an NFT structure above the magnetic return pole 502, e.g., see the NFT of FIG. 5. The conductive metal film will eventually include a notch extending from the main body, and a notch diffusion barrier layer interposed between the two, as will be discussed in detail below, e.g., see FIG. 6C.

With continued reference to FIG. 6A, according to one approach, the deposition thickness of the main body 526 may be about 150 nm, but could be higher or lower depending on the desired embodiment.

Figure 6B:
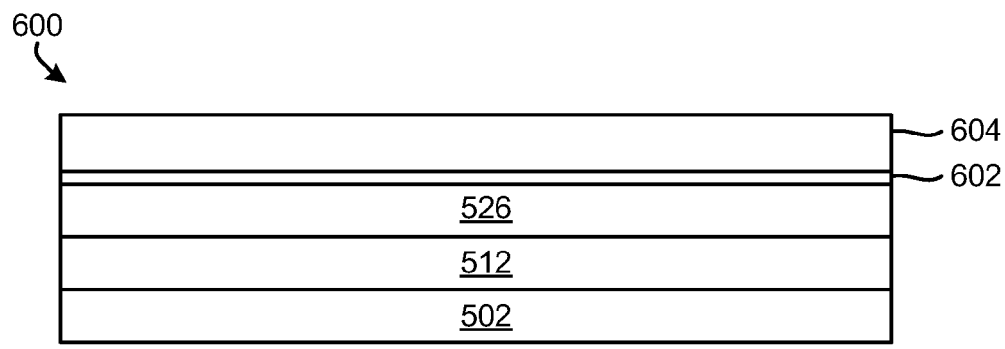

Referring to FIG. 6B, a notch diffusion barrier layer 602 and a notch layer 604 are formed above the aforementioned main body 526 of the conductive metal film. As illustrated, the notch diffusion barrier layer 602 is positioned between the notch layer 604 and the main body 526, thereby separating the two.

The deposition thickness (t2) of the notch diffusion barrier layer 602 is preferably between about 5 angstroms (Å) and about 50 Å, but could be higher or lower. A thickness of the notch diffusion barrier layer 602 within the aforementioned range is preferably preserved, despite any subtractive processes that may be performed on said layer, as will soon become apparent.

Figure 6C:
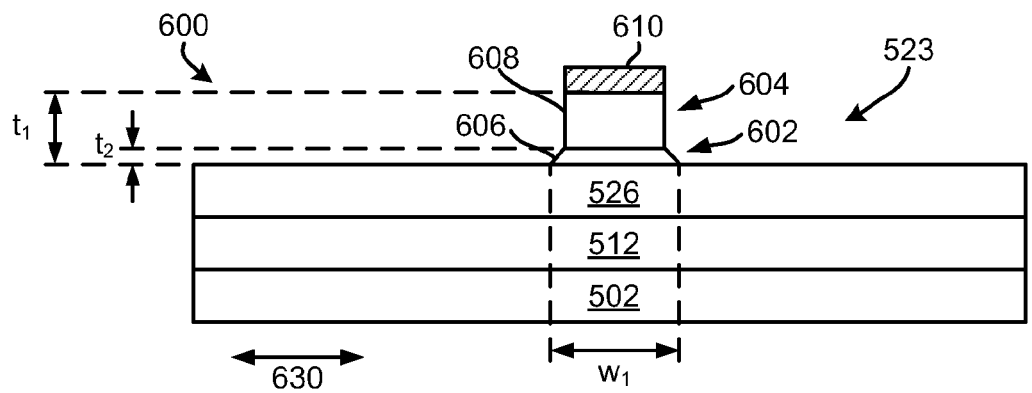

Looking now to FIG. 6C, a resist 610, e.g., of any type known in the art, is placed over the notch layer 604. Moreover, a subtractive process may be performed on the notch diffusion barrier layer 602 and notch layer 604. According to various approaches, the subtractive process may include ion milling, but may include other processes that would be apparent to one skilled in the art upon reading the present description, e.g., in view of the materials used in the layers of the apparatus 600.

The subtractive process thereby preferably defines the lateral extent of a notch diffusion barrier layer 606 and a notch 608 from the notch diffusion barrier layer 602 and the notch layer 604, respectively. Thus, as described above, the main body 526 and notch 608 extending from the main body 526 form the conductive metal film of the NFT created in the process steps illustrated in FIGS. 6A-6H.

With continued reference to the apparatus 600 shown in FIG. 6C, the sidewalls of the notch diffusion barrier layer 606 taper together therealong (e.g., at a nonzero angle) as they approach the notch 608. This tapered construction results in improved functionality and definition of the notch. However, in alternate embodiments, no taper may be present, but rather the notch diffusion barrier layer 606 may have vertical sidewalls.

The width $w_1$ of the notch diffusion barrier layer 606 in a cross track direction 630 may be between about 10 nm and about 120 nm, more preferably between about 20 nm and about 100 nm, but could be higher or lower depending on the desired embodiment. Furthermore, a total deposition thickness $t_1$ of the notch diffusion barrier layer 606 and the notch 608 may be between about 30 nm and about 100 nm, preferably between about 40 and about 60 nm, ideally about 50 nm, but could be higher or lower.

With continued reference to FIG. 6C, the notch diffusion barrier layer 606 is also interposed between the notch 608 and the main body 526. The inventors have discovered that by placing a diffusion barrier layer between the notch 608 and the main body 526, the thermal stability of the notch 608 is greatly improved. This result could not have been predicted without conducting experimentation, especially for structures having the dimensions disclosed herein. Without wishing to be bound by any theory, it is presently believed that the notch diffusion barrier layer 606 prevents the diffusion of notch material 608 into the main body 526 thereby preserving the physical integrity of the notch material and the functionality of the apparatus 600 as a whole.

The notch layer 604 and the main body 526 of the conductive metal film preferably include the same material(s). Illustrative materials for the conductive metal film, having the notch layer 604 and the main body 526, include, but are not limited to, gold, silver, copper, etc., and/or alloys thereof. While an alloy material used to form the conductive metal film improves the material stability of the resulting NFT, such embodiments also alter the optical properties of the structure. Thus, in various embodiments, the material composition of the NFT and/or the characteristics of the notch diffusion barrier layer 606 (e.g., thickness, shape, material, etc.) may be tuned to achieve a desired overall NFT performance, as will be discussed in more detail below.

Although the notch layer 604 preferably includes the same material(s) as the main body 526, the notch diffusion barrier layer 602 may have a different material composition than the notch layer 604 and/or main body 526. The material(s) used for the notch diffusion barrier layer 602 preferably include metals that have low solubility in Au, low miscibility in Au, do not form secondary phases with Au at high temperatures and have a high melting point (e.g., greater than about 1200 degrees C.). Illustrative materials for the notch diffusion barrier layer 602 include, but are not limited to, metals such as Rh, W, Mo, Ru, Ir, Co, Ni, Pt, B, etc., and/or alloys thereof. In other embodiments, the notch diffusion barrier layer 602 may include alloys of gold in addition to one or more of the metals, e.g., Rh, W, Mo, Ru, Ir, Co, Ni, Pt, B, etc.

Despite the subtractive process performed on the apparatus 600, e.g., as shown in FIG. 6C, the thickness of the diffusion barrier layer 602 preferably remains within the aforementioned range for deposition thereof. Thus the deposition thickness $t_2$ of the notch diffusion barrier layer 606 preferably remains between about 5 angstroms (Å) and about 50 Å, but could be higher or lower.

The thickness $t_2$ of the notch diffusion barrier layer 606 affects the thermal stability of the notch 608 in addition to the efficiency of the NFT structure. As the thickness $t_2$ of the notch diffusion barrier layer 606 increases, the thermal stability improves while the efficiency of the NFT structure decreases. Moreover, as the thickness $t_2$ of the notch diffusion barrier layer 606 decreases, the efficiency of the NFT structure improves and the thermal stability decreases. Thus, depending on the desired embodiment, the thickness $t_2$ of the notch diffusion barrier layer 606 may be tuned to achieve the desired properties for a given embodiment, e.g., in consideration of materials used, operation temperatures, type of media, distance of the apparatus from the media, etc.

Figure 6D:
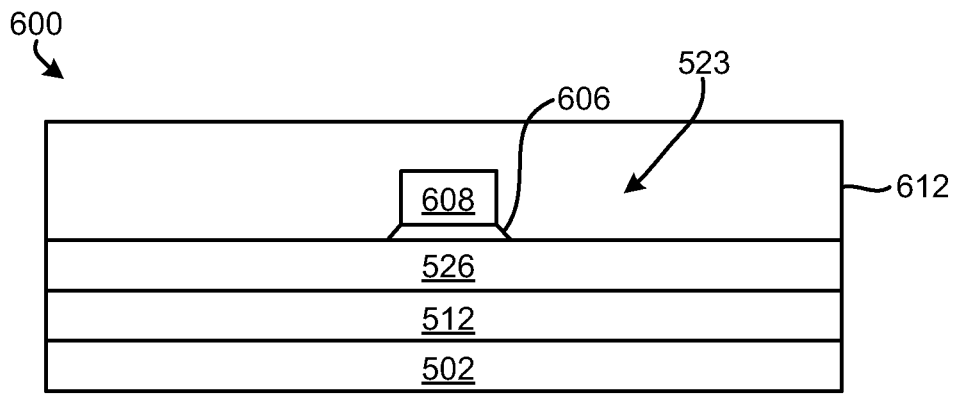

Looking now to FIG. 6D, the resist 610 is preferably removed from the apparatus 600, and an dielectric layer 612 is deposited over the exposed portions of the notch diffusion barrier layer 606, notch 608 and main body 526. Illustrative materials for the oxide layer 612 may include $SiO_2$, $AlO_x$, $MgF_2$, $CaF_2$, etc., and/or combinations (composites) thereof.

To define the upper surface of the oxide layer 612, a CMP and Reactive-Ion Etching (RIE) combination is preferably performed on the oxide layer 612. However, in other approaches, supplemental and/or alternative process steps may be performed on the upper surface of the oxide layer 612.

Figure 6E:
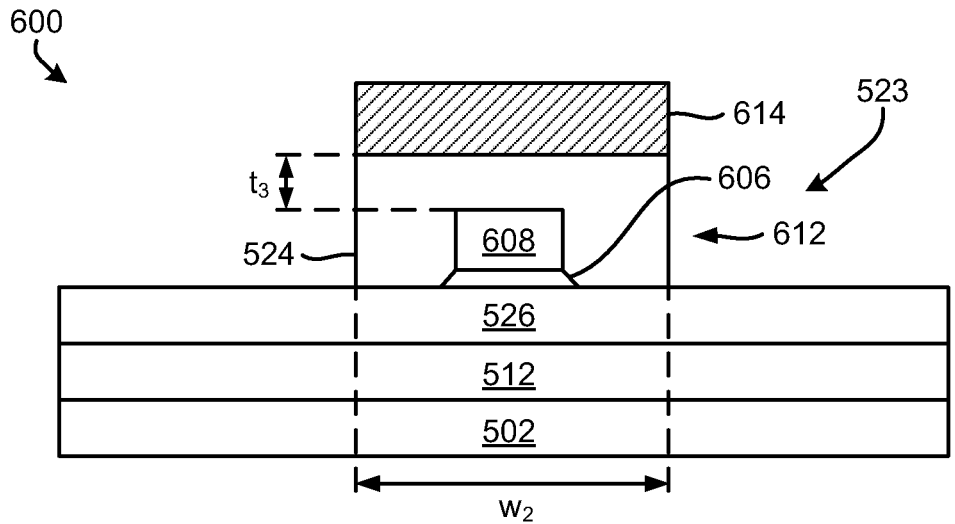

As shown in FIG. 6E, a second resist 614 is lithographically patterned on top of the oxide layer 612, whereby a subtraction process may be performed on the apparatus 600. The subtraction process thereby preferably defines the lateral extent of an aperture 524 from the oxide layer 612. According to various approaches, the subtractive process may include any of those described above with reference to FIG. 6C.

The lateral extent $w_2$ of the aperture 524 may be about 300 nm, more preferably between about 250 nm and about 500 nm, but could be higher or lower. Additionally, the deposition thickness $t_3$ between the top of the notch 608 and the diffusion barrier 616 may be between about 10 nm and about 150 nm, more preferably between about 20 nm to about 100 nm, but could be higher or lower depending on the desired embodiment.

As illustrated, the aperture 524 may have a "C" shape in some approaches. As also illustrated, the conductive metal film (526, 608) has an inverted T-shape.

In alternative approaches, the conductive metal film (526, 608) may have an "E" shape, whereby wings (not shown) extend upwardly from opposite ends of the main body 526. Although not illustrated, the E shaped conductive metal film may act as a plasmonic device with a field enhancing notch, similar to the T-shaped conductive film as described herein, but is not limited thereto.

Figure 6F:
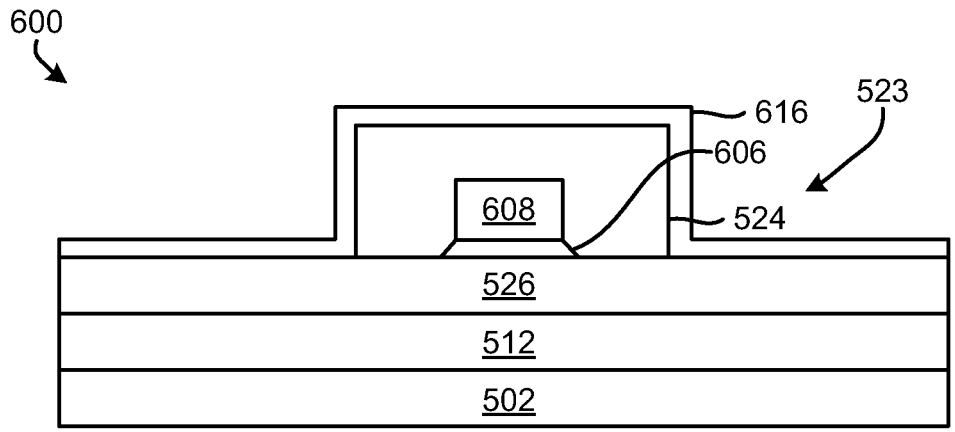

Referring now to FIG. 6F, a metallic layer 616 is deposited over the exposed portions of the aperture 524 and the main body 526. The metallic layer acts as a diffusion barrier between the aperture 524 and the magnetic lip 522.

Figure 6G:
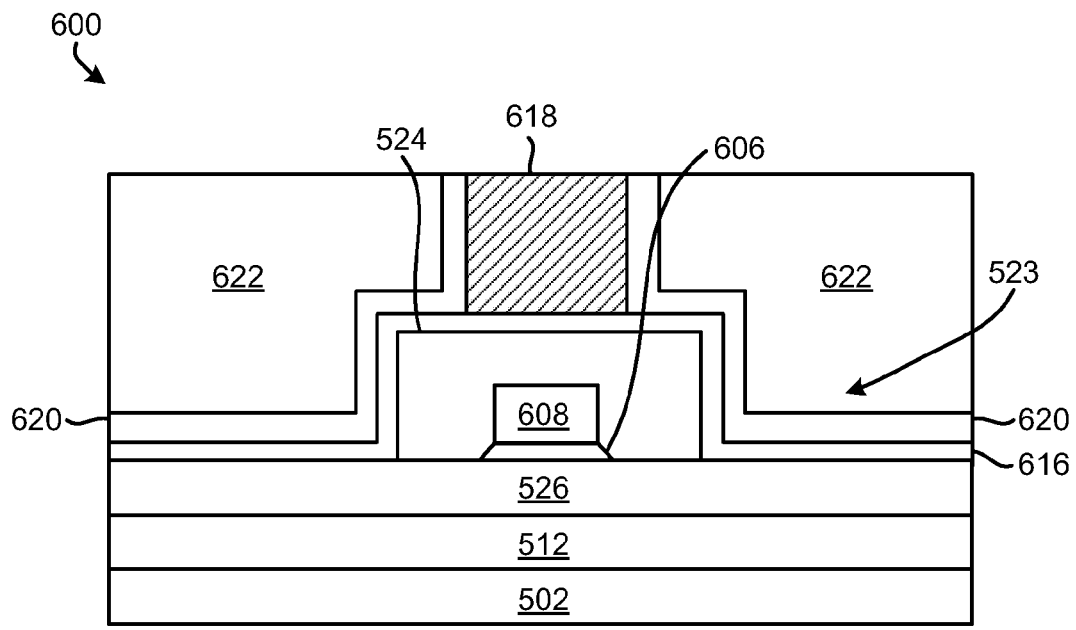

A resist 618 may be patterned above the diffusion barrier 616, as shown in FIG. 6G, whereby a wraparound layer 620 and heat sink 622 may be formed. The resist 618 may include any conventional material as would be appreciated by one skilled in the art upon reading the present description. Moreover, the wraparound layer 620 and the heat sink 622 are comprised of materials with high thermal conductivity such as Au, Ag, Cu, Ta, Ti, Cr, etc. However, in other embodiments the wraparound layer 620 and/or heat sink 622 may include any other desirable materials.

Figure 6H:
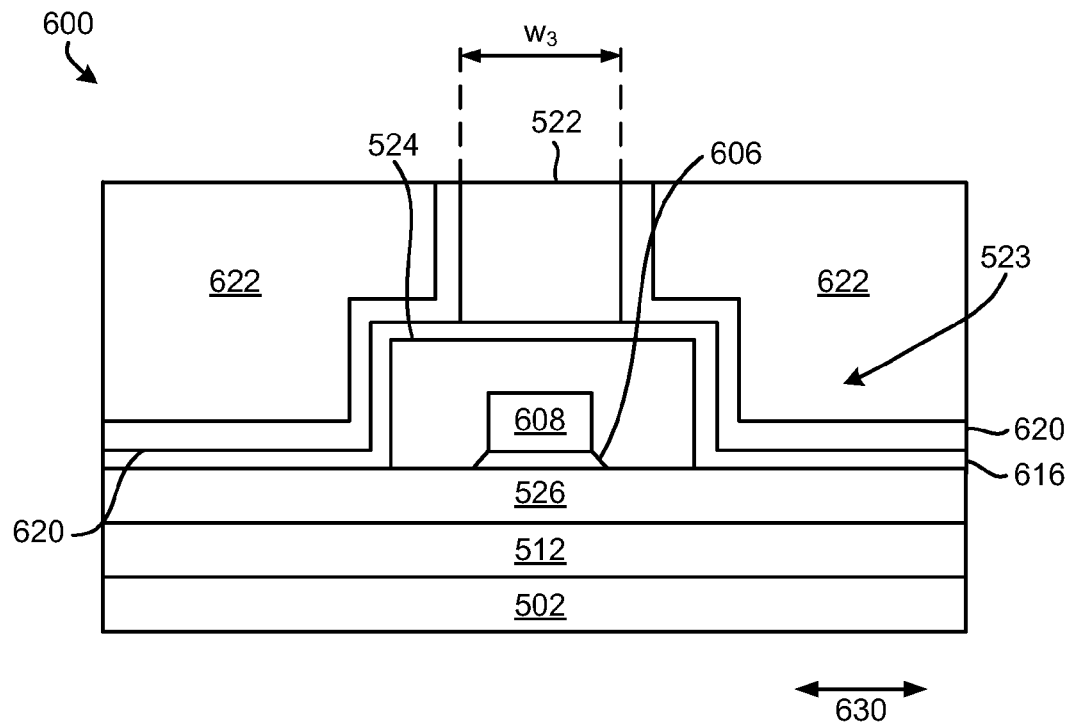

Moving to FIG. 6H, the resist 618 is preferably removed using a combination of subtractive processes that may include ion milling, reactive ion etch and wet etching. Magnetic lip 522 is then deposited in the void created after removal of resist 618. Depending on the desired embodiment, the magnetic lip 522 may be formed using sputtering, plating, or any of the other methods described herein and/or which would be apparent to one skilled in the art upon reading the present description.

In various embodiments, the magnetic lip 522 may include any of the materials listed above with reference to FIG. 5. However, in further approaches, the magnetic lip 522 may include any suitable magnetic alloy, including Co, Fe, Ni, etc., and/or combinations thereof. The width $w_3$ of the magnetic lip 522 in a cross track direction 630 may be between about 150 nm and about 500 nm, but could be higher or lower depending on the desired embodiment.

Figure 7A:
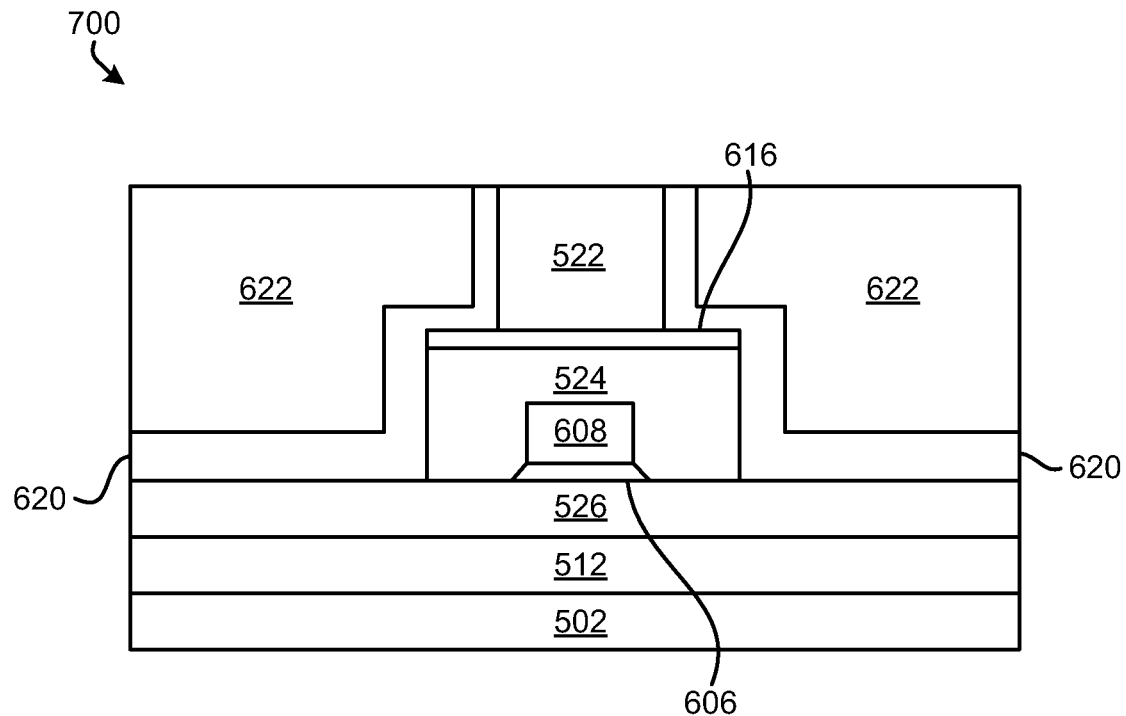
FIG. 7A is a partial side views of an apparatus according to one embodiment.
Figure 7B:
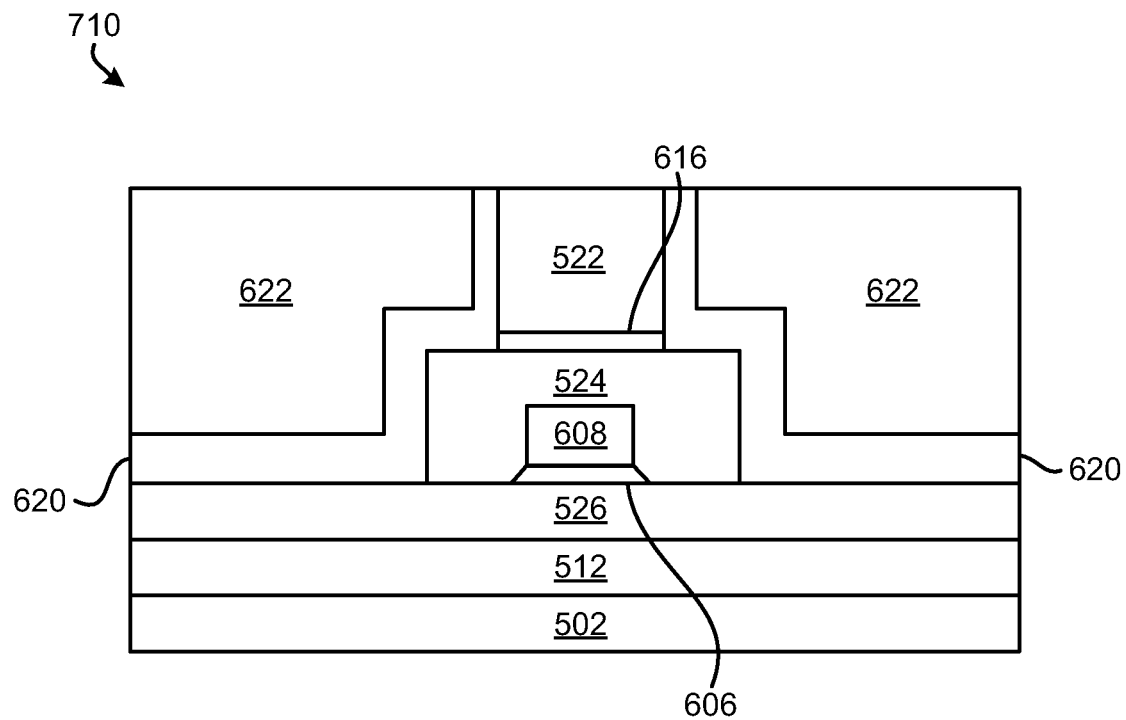
FIG. 7B is a partial side views of an apparatus according to one embodiment.
Figure 7C:
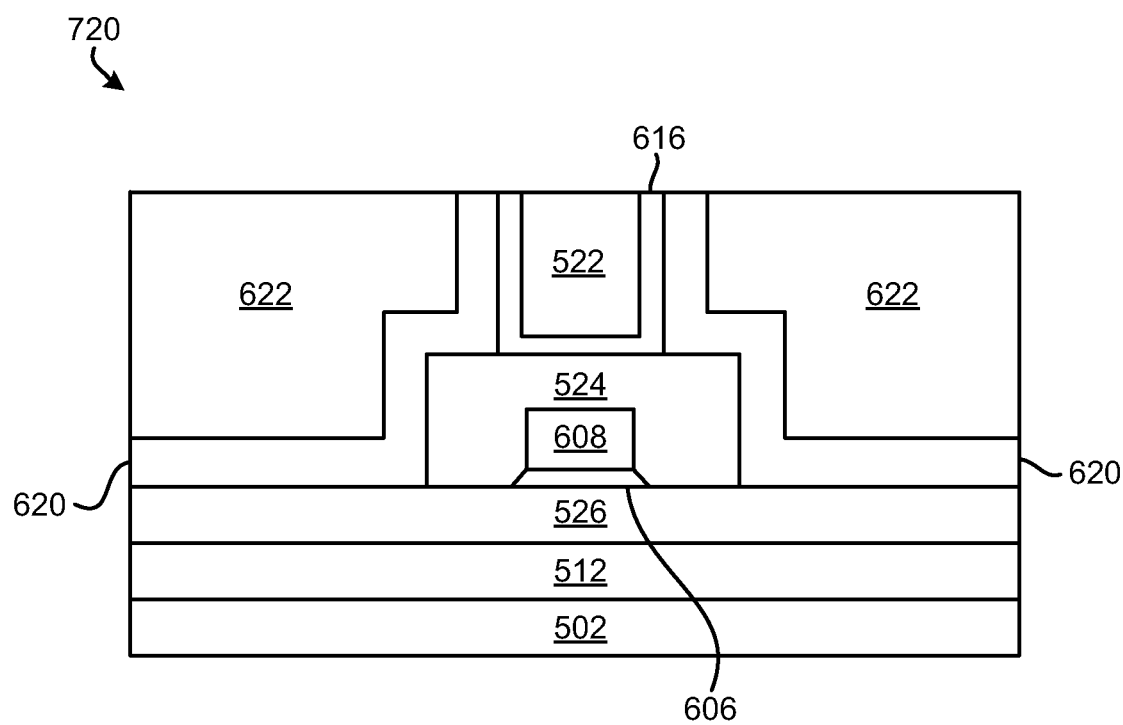
FIG. 7C is a partial side views of an apparatus according to one embodiment.

According to several illustrative embodiments, FIGS. 7A-7C depict variations of the embodiment of FIG. 6H having exemplary constructions of the diffusion barrier 616 within an apparatus 700, 710, 720 respectively. Accordingly, various components of FIGS. 7A-7C have common numbering with those of FIG. 6H. Moreover, it should be noted that FIGS. 7A-7C (and the other FIGS.) should be deemed to include any and all possible permutations.

Referring now to FIG. 7A, the diffusion barrier 616 is illustrated as being formed along the entire top surface of the aperture 524. Alternatively, as shown in FIG. 7B, the diffusion barrier 616 may extend along only a portion of the top surface of the aperture 524 while covering the entire bottom surface of the magnetic lip 522.

Looking now to FIG. 7C, the diffusion barrier 616 may be formed such that it encircles the magnetic lip 522 on three sides. As mentioned above, none of the embodiments illustrated in FIGS. 7A-7C are intended to limit the invention in any way. Rather they are intended to illustrate the different construction options of the diffusion barrier 616 as used herein.

It should be noted that methodology presented herein for at least some of the various embodiments may be implemented, in whole or in part, in computer hardware, software, by hand, using specialty equipment, etc. and combinations thereof.

Moreover, any of the dimensions described herein with regard to any of the FIGS. and/or any other embodiment thereof, may be higher or lower than the values listed, depending on the particular sizes and shapes of components in such particular embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a write pole; and
    a near field transducer comprising a conductive metal film having a main body, a notch extending from the main body, and a notch diffusion barrier layer interposed between the notch and the main body,
    wherein the notch diffusion barrier layer, as formed, includes alloys of gold with at least one of Rh, W, Mo, Ru, Ir, Co, Ni, Pt, B.

2. The apparatus as recited in claim 1, comprising an aperture layer above the notch, notch diffusion barrier layer and main body; and a second diffusion barrier layer between the aperture lwyer and the write pole.

3. The apparatus as recited in claim 2, wherein a width of the aperture layer is greater than a width of the write pole, wherein the second diffusion barrier layer extends along the entirety of a bottom edge of the write pole and only a portion of an upper edge of the aperture layer.

4. The apparatus as recited in claim 2, wherein the second diffusion barrier layer extends along an upper edge of the aperture layer, along lateral side edges of the aperture layer, and along the main body in a direction away from the aperture layer.

5. The apparatus as recited in claim 1, wherein the conductive metal film is selected from a group consisting of gold, a gold alloy, silver, and a silver alloy.

6. The apparatus as recited in claim 1, wherein a deposition thickness of the notch diffusion barrier layer is between about 5 angstroms and about 50 angstroms.

7. The apparatus as recited in claim 1, wherein sidewalls of the notch diffusion barrier layer taper together therealong as they approach the notch.

8. The apparatus as recited in claim 1, wherein a width of the notch diffusion barrier layer in a cross track direction is between about 20 nm and about 100 nm.

9. The apparatus as recited in claim 1, wherein a total deposition thickness of the notch diffusion barrier layer and the notch is between about 30 nm and about 100 nm.

10. The apparatus as recited in claim 1, further comprising
    a magnetic medium;
    a drive mechanism for passing the magnetic medium over the near field transducer;
    a writer adjacent the near field transducer; and
    a controller electrically coupled to the writer for controlling operation of the writer.

11. An apparatus, comprising:
    a write pole;
    a near field transducer adjacent the write pole, the near field transducer comprising a conductive metal film having a main body, a notch extending from the main body, and a notch diffusion barrier layer interposed between the notch and the main body;
    an aperture layer above the notch, notch diffusion barrier layer and main body; and
    a second diffusion barrier layer between the aperture layer and the write pole,
    wherein the notch diffusion barrier layer includes a metal selected from a group consisting of Rh, W, Mo, Ru, Ir, Co, Ni, Pt, B, and alloys thereof.

12. The apparatus as recited in claim 11, wherein the second diffusion barrier layer extends along a bottom edge of the write pole and along lateral side edges of the write pole.

13. The apparatus as recited in claim 11, wherein the notch diffusion barrier layer, as formed, includes alloys of gold with the at least one of Rh, W, Mo, Ru, Ir, Co, Ni, Pt, B.

14. The apparatus as recited in claim 11, wherein the second diffusion barrier layer extends along an upper edge of the aperture laver, along lateral side edges of the aperture layer, and along the main body in a direction away from the aperture layer.

15. The apparatus as recited in claim 11, wherein a width of the aperture layer is greater than a width of the write pole, wherein the second diffusion barrier layer extends along an entirety of a bottom edge of the write pole and only a portion of an upper edge of the aperture layer.

16. The apparatus as recited in claim 11, wherein sidewalls of the notch diffusion barrier layer taper together therealong as they approach the notch.

17. The apparatus as recited in claim 11, wherein a width of the notch diffusion barrier layer in a cross track direction is between about 20 nm and about 100 nm.

18. The apparatus as recited in claim 11, wherein a total deposition thickness of the notch diffusion barrier layer and the notch is between about 30 nm and about 100 nm.

19. The apparatus as recited in claim 11, further comprising
    a magnetic medium;
    a drive mechanism for passing the magnetic medium over the near field transducer;
    a writer adjacent the near field transducer; and
    a controller electrically coupled to the writer for controlling operation of the writer.

20. An apparatus, comprising:
    a write pole;
    a near field transducer adjacent the write pole, the near field transducer comprising a conductive metal film having a monolithic main body formed above a cladding layer, a monolithic notch extending from the main body, and a notch diffusion barrier layer interposed between the notch and the main body;
    an aperture layer above the notch, notch diffusion barrier layer and main body; and
    a second diffusion barrier layer between the aperture layer and the write pole,
    wherein the notch diffusion barrier layer, as formed, includes a metal selected from a group consisting of Rh, W, Mo, Ru, Ir, Co, Ni, Pt, B, and alloys thereof,
    wherein sidewalls of the notch diffusion barrier layer taper together therealong as they approach the notch,
    wherein the notch has a generally rectangular shape,
    wherein the second diffusion barrier layer extends along an upper edge of the aperture layer, along lateral side edges of the aperture layer, and along the main body in a direction away from the aperture layer,
    wherein portions of the second diffusion barrier layer extending along the main body in a direction away from the aperture layer are substantially coplanar with the notch diffusion barrier layer.

* * * * *

UNITED STATES PATENT AND TRADEMARK OFFICE
CERTIFICATE OF CORRECTION

PATENT NO. : 9,099,112 B1
APPLICATION NO. : 14/170462
DATED : August 4, 2015
INVENTOR(S) : Hamid Balamane et al.

Page 1 of 1

It is certified that error appears in the above-identified patent and that said Letters Patent is hereby corrected as shown below:

In the claims:

col. 13, line 28 replace "aperture lwyer and" with --aperture layer and--;

col. 14, line 16 replace "aperture laver," with --aperture layer--.

Signed and Sealed this
Twenty-first Day of June, 2016

Michelle K. Lee
*Director of the United States Patent and Trademark Office*